Figure 1:
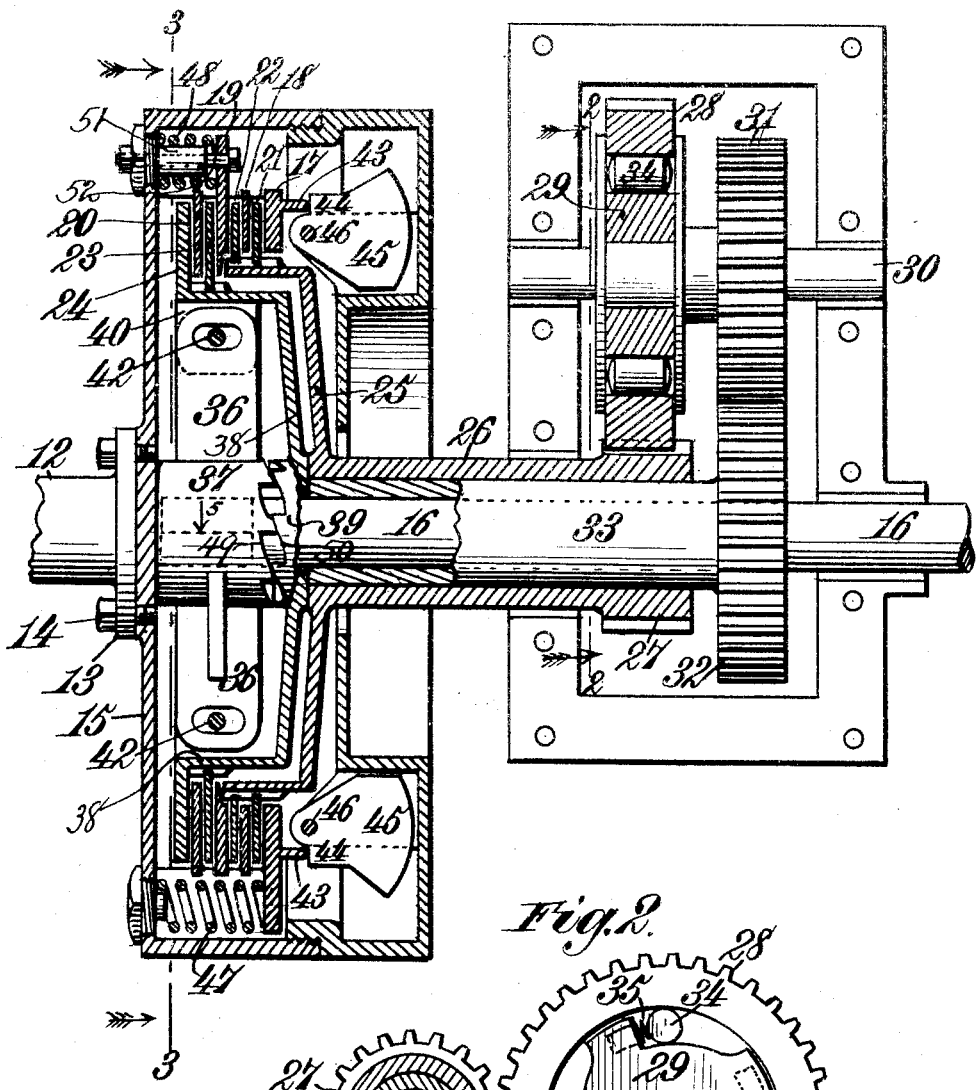

No. 784,285. PATENTED MAR. 7, 1905.
T. L. & T. J. STURTEVANT.
POWER TRANSMITTING MECHANISM.
APPLICATION FILED DEC. 10, 1904.

2 SHEETS—SHEET 1.

Witnesses: Inventors:

No. 784,285.

Patented March 7, 1905.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

POWER-TRANSMITTING MECHANISM.

SPECIFICATION forming part of Letters Patent No. 784,285, dated March 7, 1905.

Application filed December 10, 1904. Serial No. 236,359.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Power-Transmitting Mechanisms, of which the following is a specification, reference being had therein to the accompanying drawings.

This invention relates to a centrifugal-clutch power-transmitting mechanism by which different speeds may be imparted to a power-driven shaft from a driving-shaft or motor and through the medium of which changes from low-speed to high-speed, and vice versa, of the driven shaft will be automatically effected, according to the variations of the load or resistance, so that when the load or duty on the driven shaft exceeds a certain predetermined limit or the speed of the motor or driving-shaft falls below a certain predetermined limit, in proportion to the load or duty on the driven shaft, the latter will receive its motion from the motor or driving-shaft through the medium of the low-speed or high-power train of gearing.

The present invention is an improvement on the clutch-device power-transmitting mechanism covered by our United States Patent No. 766,551, granted August 2, 1904; and the present invention has for its object to provide a centrifugally-controlled clutch device for transmitting power from a driving to a driven shaft at different speeds, but in which when the duty or torque of the driven shaft exceeds a predetermined limit the low-speed and high-power gearing will transmit motion to the driven shaft without necessarily reducing the speed of rotation of the fly-wheel clutch device or of the motor or driving-shaft from which power is derived. This is an important improvement in utilizing the power received from some classes of motors which can exert but comparatively little power when running at low speeds and in which the power of the motor increases from low speed to high speed.

In carrying the present invention into effect a plurality of centrifugally-controlled clutch devices transmitting power at different speeds to the driven shaft is preferably, but not necessarily, employed, in that the low-speed driving-gear may be directly connected with the driving-shaft or motor without the intervention of a clutch device. In employing two clutch devices, in accordance with the present invention, the low speed clutch device will first be brought into action to transmit power when the driving-shaft or motor is started and is running at a low speed; but when the speed of the motor or driving-shaft is increased so as to exceed a certain predetermined limit the high-speed clutch device will be automatically thrown into operation. If, however, while the motor or driving-shaft is still running at a high speed the load or duty on the driven shaft exceeds a certain predetermined limit, so as to be in excess of a certain predetermined torsional strain, the high-speed clutch device will be automatically thrown out of action without necessarily requiring a decrease of the speed of the motor or driving-shaft to effect this result, and power will then be transmitted to the driven shaft through the low-speed gearing, which will be operated from the still rapidly-running driving-shaft or motor, and such operation of the driven shaft will continue until the load or duty thereon falls below a certain predetermined torsional strain, when without changing or increasing the speed of the driving-shaft or motor the high-speed clutch device will be automatically thrown into operation and the speed of the driven shaft thus be automatically increased up to the limit of its speed by the power applied without interference from the other clutch device or devices.

Figure 2:
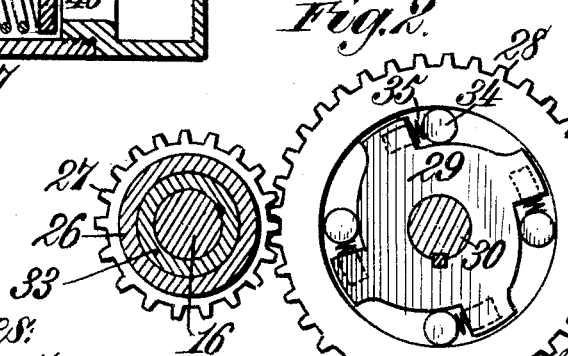
Figure 3:
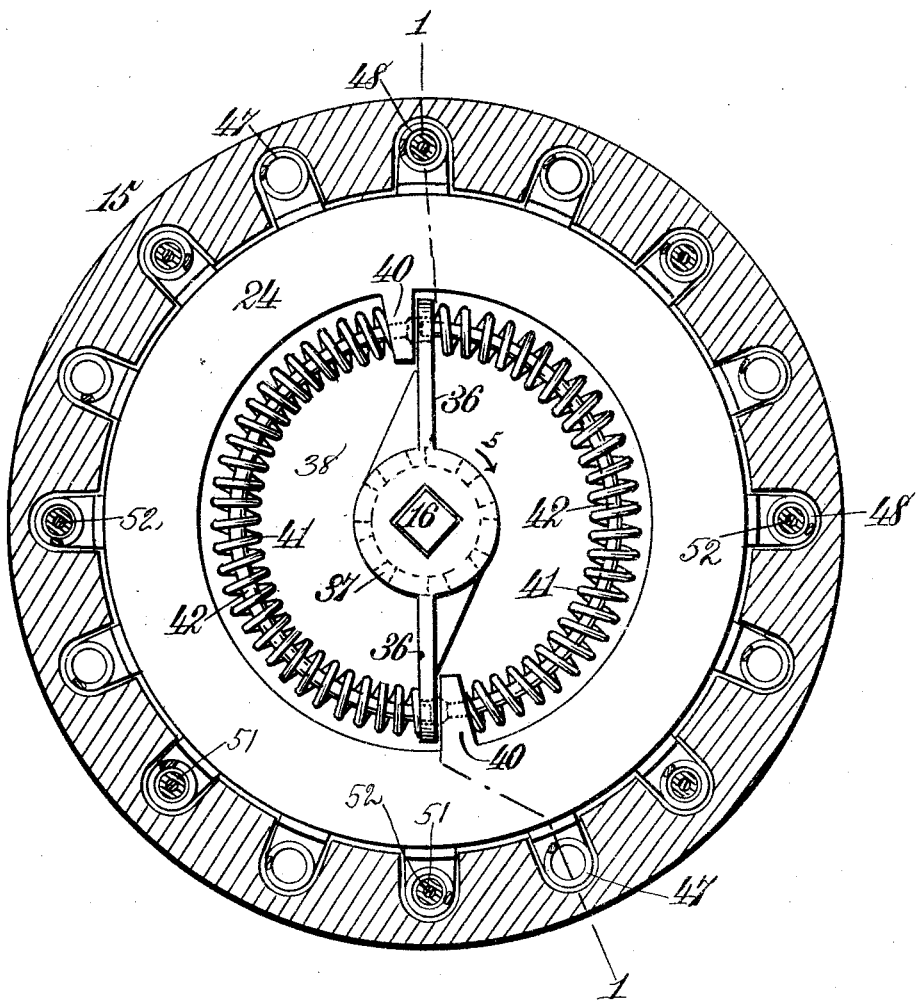

In the accompanying drawings, Figure 1 is a sectional view of a clutch-device power-transmitting mechanism embodying the present invention, the section being taken on line 1 1, Fig. 3. Fig. 2 is an elevation, partly in cross-section, on line 2 2, Fig. 1, looking in the direction of the arrows adjacent to said line. Fig. 3 is a sectional elevation on line 3 3, Fig. 1, looking in the direction of the arrows adjacent to said line.

Referring to the drawings, 12 denotes a portion of a motor-shaft or power-shaft, attached to which is a flange 13, secured by screws or bolts 14 to a hollow fly-wheel or casing 15, preferably formed in two parts screwed together, as shown, and inclosing the centrifugally-controlled clutch devices through which power is transmitted from the fly-wheel or clutch-casing 15 to the driven shaft 16, which latter may be utilized for driving an automobile or for any other desired purpose. The clutch devices herein shown and which will preferably be employed are of the multiple-disk or multiple-ring type, comprising the flat rings or annular plates 17, 18, 19, and 20, notched or otherwise constructed at their peripheries for engagement with suitable projections or parts of the fly-wheel, and the flat rings or annular plates 21, 22, 23, and 24, which will coöperate frictionally with the first-mentioned flat rings or plates in transmitting power to the driven shaft 16. To this end the rings or plates 21 22 are notched or otherwise constructed at their inner edges for engagement with an arm 25 of a sleeve 26, carrying a pinion 27, which meshes with a gear-ring 28, connected by a silent ratchet or grip device with a hub 29, keyed to a counter-shaft 30, carrying a gear-wheel 31, which meshes with a gear-wheel 32 on a sleeve 33, loose on the driven shaft 16. The silent ratchet or grip device referred to is or may be essentially the same in construction and operation as that of Patent No. 766,551 and comprises gripping-rollers 34, held in operative positions by springs 35, this silent ratchet or gripping device permitting the low-speed gearing to overrun when the high-speed clutch device is in operation, so that the low-speed gearing will be inoperative when the high-speed clutch is transmitting power.

On a squared portion of the driven shaft 16 fits a hub 37, having arms 36. The annular plate 24 forms a part of a shell or drum 38, having a hub portion 39 integral or rigid with the sleeve 33, which fits loosely on the driven shaft 16, said shell 38 being provided with lugs or abutments 40, against which the outer ends of the arms 36 are normally held by the spiral springs 41, herein shown as encircling rods 42, mounted in the shell 38 and serving to hold said springs in place. The flat ring or plate 23 has a notched engagement with the peripheral portion of said shell or drum 38.

The master-plate 17 for the low-speed clutch device is provided with a rib or projection 43, engaged by shoulder portions 44 of centrifugally-acting weights 45, pivoted within the fly-wheel shell 15 on pins 46 and normally held in their inner or inoperative positions by low-speed clutch-springs 47 pressing against the said master-plate 17, but which springs will yield when the fly-wheel attains a certain predetermined speed of revolution, so as to permit the friction rings or plates 17, 18, 19, 21, and 22 to be pressed into frictional contact with each other, so as to transmit the rotary movements of the fly-wheel 15 to the sleeve 26 and from the latter through the pinion 27, gear-ring 28, hub 29, shaft 30, gears 31 and 32 to sleeve 33, shell or drum 38, arms 36, and hub 37 to the driven shaft 16. When the torsion is sufficient, however, part of the torque is transmitted directly to hub 37 from hub 39 through the toothed faces on said hubs. The master-plate 19 is acted on by a series of high-speed clutch-springs 48, the stress of which in addition to the stress of the springs 47 must be overcome before the high-speed clutching parts comprising the flat rings or plates 19, 20, 23, and 24 are forced into frictional contact with each other, and when these last-named plates or parts are thus forced into frictional contact with each other by the operation of the centrifugal weights 45 power will be transmitted to the driven shaft 16 through the arms 36 and the hub 37 rotating with said shaft, so as to drive the latter at a high speed, and when the high-speed clutches are thus in operation the low-speed gearing will overrun or be ineffective, as in the power-transmitting device of our Patent No. 766,551, hereinbefore referred to. If, however, while the high-speed clutch device is in operation and while the motor or driving shaft from which the fly-wheel 15 is operated is still running at high speed the resistance or duty on the driven shaft becomes sufficiently great to overcome the torsional stress exerted by the springs 41, the said springs will yield sufficiently to permit a slight turning movement of the hub 37 relative to the hub 39 in the direction denoted by the arrow 5 in Figs. 1 and 3, and as the said hubs are provided with the contiguous inclines 49 and 50 pressure of the hub 37 against the hub 39 will be slackened, thus permitting the latter and the plate 24, connected therewith, to move outward slightly, so as to relieve the plates 20, 23, and 24 from driving frictional contact with each other and with the master-plate 19, the said master-plate 19 being prevented from following the outward movements of the said friction-plates by the stops or abutments 51 on the pins 52 and which stops or abutments are encircled by the high-speed clutch-springs 48. Thus without necessarily decreasing the speed of rotation of the motor or driving-shaft or of the fly-wheel 15, rotating therewith, and consequently without necessarily relaxing the centrifugal action of the weights 45, the high-speed clutch can be thrown out of action, thereby permitting the low-speed clutch to again resume its operation in transmitting power to the driving-shaft 16, and when the resistance load or torque of the driven shaft falls below the torsional stress of the springs 41 a slight reverse rotation of the hub 37 relative to the hub 39 will restore the parts to their former positions, so that the high-speed clutch device may resume its operation. If, however, the load on the driven shaft and the speed of the driving-shaft and fly-wheel both fall below certain limits, the high-speed clutch will be automatically thrown out of action and the low-speed clutch will automatically resume its operation. As the clutch devices are housed within the fly-wheel casing adapted to contain a lubricant, and may therefore run in oil, there may be more or less slip between the clutching parts as the changes to different speeds are effected, so that such changes will be smoothly effected without any sudden jerks or jars.

While we have herein shown and prefer to employ both low-speed and high-speed clutch devices, as herein described, we do not wish to limit our invention to the two clutch devices referred to, as the low-speed clutch device might be dispensed with and the low-speed gearing be driven directly from the fly-wheel or power-shaft without departing from the spirit of our invention, the esential feature of which consists in providing means whereby a centrifugally-controlled high-speed clutch device may be thrown out of action and a low-speed power-transmitting mechanism be thrown into action without necessarily reducing the speed of rotation of the fly-wheel or part carrying the centrifugal weights or of the motor or driving-shaft from which power is derived. We do not, therefore, wish to be understood as limiting our invention to the particular devices or to the details of construction herein shown and described, as these may be varied widely without departing from the essence of our invention; nor do we desire to be confined to the use of any especial type of centrifugally-controlled clutch devices, for these may be greatly varied without departing from the spirit of our invention.

Having thus described our invention, we claim and desire to secure by Letters Patent—

1. In a power-transmitting device, the combination with a rotating driving part and a rotating shaft or part to be driven therefrom, of a low-speed power-transmitting mechanism, a centrifugally-controlled, high-speed clutch device, and torsionally-acting means whereby, without necessarily reducing the speed of rotation of the driving part or motor, the said high-speed clutch device may be thrown out of action when the torque or resistance of the driven shaft or part exceeds the stress of the said torsionally-acting means, to permit the low-speed power-transmitting mechanism to be set into operation.

2. In a power-transmitting device, the combination with a rotating driving part and a rotating shaft or part to be driven therefrom, of a low-speed power-transmitting mechanism, centrifugally-controlled, high-speed and low-speed clutch devices, and torsionally-acting means whereby, without necessarily reducing the speed of rotation of the driving part or motor, the said high-speed clutch device may be thrown out of action when the torque or resistance of the driven shaft or part exceeds the stress of the said torsionally-acting means, to permit the low-speed power-transmitting mechanism to be set into operation.

3. In a power-transmitting device, the combination with a rotating driving part and a rotating shaft or part to be driven therefrom, of a low-speed power-transmitting mechanism, centrifugally-controlled, high-speed and low-speed clutch devices, torsionally-acting means whereby, without necessarily reducing the speed of rotation of the driving part or motor, the said high-speed clutch device may be thrown out of action when the torque or resistance of the driven shaft or part exceeds the stress of the said torsionally-acting means, to permit the low-speed power-transmitting mechanism to be set into operation, and a fly-wheel or casing within which said centrifugally-controlled clutch devices are inclosed.

4. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, and high-speed and low-speed springs acting in opposition to said weights.

5. In a power-transmitting device, the combination with a rotating driving part and a rotating shaft or part to be driven therefrom, of high-speed and low-speed multiple-disk clutch devices suitably connected with said driven shaft or part, a single set of weights by which said clutch devices are controlled, and high-speed and low-speed springs acting in opposition to said weights.

6. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, high-speed and low-speed springs acting in opposition to said weights, and a fly-wheel or casing within which said clutch devices, weights and springs are inclosed.

7. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, high-speed and low-speed springs acting in opposition to said weights, a gearing-train connecting the low-speed clutch device with the said driven shaft or part, said gearing-train comprising a silent ratchet or grip device which renders ineffective the said low-speed clutch device when the said high-speed clutch device is transmitting power.

8. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, and high-speed and low-speed springs acting in opposition to said weights, stops to limit the action of the said weights on the high-speed clutching parts, and yielding torsional means which will permit the high-speed clutching parts to be disengaged when the torque or resistance of the driven shaft or part exceeds the stress of the said torsionally-acting means, to permit the low-speed clutch to become effective.

9. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, and high-speed and low-speed springs acting in opposition to said weights, stops to limit the action of the said weights on the high-speed clutching parts, yielding torsional means which will permit the high-speed clutching parts to be disengaged when the torque or resistance of the driven shaft or part exceeds the stress of the said torsionally-acting means, to permit the low-speed clutch to become effective, and a fly-wheel or casing within which said clutch devices, springs, weights, stops and torsional means are inclosed.

10. In a power-transmitting device, the combination with a rotating driving part and a rotating shaft or part to be driven therefrom, of high-speed and low-speed clutch devices suitably connected with said driven shaft or part, a single set of weights by which said clutch devices are controlled, and high-speed and low-speed springs acting in opposition to said weights, stops to limit the action of the said weights on the high-speed clutching parts, yielding torsional means which will permit the high-speed clutching parts to be disengaged when the torque or resistance of the driven shaft or part exceeds the stress of the said torsionally-acting means, to permit the low-speed clutch to become effective, a gearing-train connecting the said low-speed clutch device with the said driven shaft or part, said gearing-train comprising a silent ratchet or grip device which renders ineffective the said low-speed clutch device when the said high-speed clutch device is transmitting power, so that either of the said clutch devices may be operated to transmit power without interfering with the other.

11. In a power-transmitting device, adapted for use in automobiles, the combination with a low-speed power-transmitting train of gearing, of a centrifugally-controlled high-speed clutch device, and a spring-controlled torque mechanism by which, when the load or the road resistance is beyond a predetermined limit, the said high-speed clutch device will be thrown out of action to permit the low-speed and high-power mechanism to become efficient without necessarily reducing the speed of the driving part or motor.

12. In a power-transmitting device, adapted for use in automobiles, the combination with a low-speed power-transmitting train of gearing, of centrifugally-controlled low-speed and high-speed clutch devices, and a spring-controlled torque mechanism by which, when the load or the road resistance is beyond a predetermined limit, the said high-speed clutch device will be thrown out of action to permit the low-speed and high-power mechanism to become efficient.

13. In a power-transmitting device, the combination of high-speed and low-speed clutch devices, of centrifugally-acting means for controlling both of said clutch devices, and torque mechanism, coöperating with said centrifugally-acting means, for controlling one of said clutch devices.

14. In a power-transmitting device, the combination of high-speed and low-speed clutch devices, of centrifugally-acting means for controlling both of said clutch devices, torque mechanism, coöperating with said centrifugally-acting means, for controlling one of said clutch devices, and means for rendering the low-speed clutch device inoperative for transmitting power to the driven part when the high-speed clutch device is transmitting power.

15. In a power-transmitting device, the combination of torque-controlled and centrifugally-controlled multiple-disk clutch mechanisms.

16. In a power-transmitting device, a plurality of centrifugally-controlled clutch devices and a torque-operated mechanism by which one of said clutch devices may be rendered inoperative when the load or resistance reaches a certain predetermined point.

17. In a power-transmitting device, the combination of a plurality of multiple-disk clutch devices and an automatic clutch-controlling torque device.

18. In a power-transmitting device, the combination of a plurality of automatic clutch devices and a controlling mechanism by which, regardless of the speed of the prime mover, one of said clutch devices may be rendered ineffective whenever the resistance or load-moving torque exceeds a predetermined force.

19. In a power-transmitting device, the combination of a plurality of automatic clutch devices and an automatic mechanism which acts to render ineffective one of said clutch devices whenever the load and resulting torque exceeds a predetermined point.

In testimony whereof we affix our signatures in presence of two witnesses.

THOMAS LEGGETT STURTEVANT.
THOMAS JOSEPH STURTEVANT.

Witnesses:
W. F. ELLIS,
L. H. STURTEVANT.